(12) United States Patent
Waffner

(10) Patent No.: US 10,938,896 B2
(45) Date of Patent: Mar. 2, 2021

(54) PEER-TO-PEER COMMUNICATION SYSTEM AND PEER-TO-PEER PROCESSING APPARATUS

(71) Applicant: Jürgen Waffner, Essen (DE)

(72) Inventor: Jürgen Waffner, Essen (DE)

(73) Assignee: innogy SE, Essen (DE)

( * ) Notice: Subject to any disclaimer, the term of this patent is extended or adjusted under 35 U.S.C. 154(b) by 77 days.

(21) Appl. No.: 16/271,538

(22) Filed: Feb. 8, 2019

(65) Prior Publication Data
US 2019/0190987 A1   Jun. 20, 2019

Related U.S. Application Data

(63) Continuation of application No. PCT/EP2016/069056, filed on Aug. 10, 2016.

(51) Int. Cl.
*H04L 29/08* (2006.01)

(52) U.S. Cl.
CPC ............ *H04L 67/104* (2013.01); *H04L 67/12* (2013.01)

(58) Field of Classification Search
CPC .............................. H04L 67/104; H04L 67/12
See application file for complete search history.

(56) References Cited

U.S. PATENT DOCUMENTS

| | | | |
|---|---|---|---|
| 9,529,923 B1* | 12/2016 | Baird, III | ............... G06F 16/182 |
| 2004/0044727 A1* | 3/2004 | Abdelaziz | ............ H04L 67/107 |
| | | | 709/203 |
| 2006/0070031 A1* | 3/2006 | Szyperski | ................. G06F 9/54 |
| | | | 717/120 |
| 2015/0020083 A1* | 1/2015 | Ben-Itzhak | .......... H04N 21/818 |
| | | | 719/320 |
| 2016/0261690 A1* | 9/2016 | Ford | ..................... H04L 9/3239 |
| 2018/0139278 A1* | 5/2018 | Bathen | .................. H04L 9/3236 |
| 2018/0150835 A1* | 5/2018 | Hunt | ....................... H04L 67/10 |

OTHER PUBLICATIONS

Veena Pureswaran, "Empowering the Edge, Practical Insights on a Decentralized Internet of Things," Apr. 1, 2015, 24 pages.
Ben Dickson, "Decentralizing IoT Networks through Blockchain," Jun. 28, 2016, 10 pages.
Anonymous, "Blockchains vs Centralized Databases | Multichain," Mar. 17, 2016, 6 pages.

* cited by examiner

*Primary Examiner* — Shean Tokuta
(74) *Attorney, Agent, or Firm* — Reinhart Boerner Van Deuren P.C.

(57) ABSTRACT

Embodiments of the disclosure relate to a communication system, in particular, peer-to-peer communication system. The communication system includes at least one peer-to-peer network having at least one peer-to-peer application and at least one peer-to-peer processing apparatus having at least one processor module configured to process at least a part of a first task during a first time slice and at least a part of at least one further task during at least one further time slice. The communication system also includes at least one peer-to-peer module assigned to the peer-to-peer processing apparatus and configured to communicate with the peer-to-peer application. At least one of the first task and the further task is a distributed peer-to-peer application provided to the peer-to-peer processing apparatus by means of the peer-to-peer application.

17 Claims, 4 Drawing Sheets

PEER-TO-PEER COMMUNICATION SYSTEM AND PEER-TO-PEER PROCESSING APPARATUS

CROSS-REFERENCE TO RELATED PATENT APPLICATION

This patent application is a continuation of PCT/EP2016/069056, filed Aug. 10, 2016, the entire teachings and disclosure of which are incorporated herein by reference thereto.

FIELD

The invention relates to a communication system, in particular, peer-to-peer communication system. Further, the invention relates to a method for operating a communication system, a peer-to-peer processing apparatus and a peer-to-peer application.

BACKGROUND

A communication network, such as the internet or an intranet, may comprise several processing apparatuses, such as computers, which comprise one or more processor modules configured to conduct/process task(s). Some of the processing apparatuses have a high processing power in order to process a task requiring a high processing power within a short time period. The task may be a specific (software) application. However, some processing apparatuses merely comprise a small processing power. These processing apparatuses are only capable of conducting tasks within significant longer timer periods.

It has been found that some of the powerful processing apparatuses are not fully used. The reason may be that the high processing power is only temporarily needed resulting in unused time periods. Another reason may be that the processing apparatus has been set up for conducting a specific task. This task may be already fulfilled or the processing of the task may not be worthwhile any more. Hence, current communication systems comprise imbalances between powerful and not fully used processing apparatuses and processing apparatuses (e.g. with small processing power) which are fully used.

Indeed, it may be possible to implement a new task in form of a new application onto a processing apparatus, such as a server, which is not fully used. For instance, a client may request the conduction of a specific task through the server (e.g. one or more computers). However, due to the structure of prior art communication systems in form of server-client structures there exist no possibility to use the generally available resources in an efficient and secure manner. In particular, the managing and controlling of the provision, installation and operation of a task in form of an application is complex and requires usually manual interactions.

A further disadvantage of server-client structures of this kind, particularly the server (or platform), apart from the high transaction costs, is that the central instance or central server manages confidential data, such as user data including e.g. access data for an application, application data, processing results or the like. A persistent problem affecting the central instance is that of protecting the confidential data stored on one or more server(s) from access by unauthorized third parties. In particular, a high degree of security expenditure is required, in order to prevent said data from being tampered with. This in turn leads to higher transaction costs. A further disadvantage is the complex and costly infrastructure for providing the described server-client structure. Furthermore, it is not possible to use available resources (free processing time of one or more processing apparatuses) by other entities in a simple manner.

Therefore, it is an object of the present invention to provide a communication system which enables to use available (processing) resources more efficient and, at the same time, with high security.

BRIEF SUMMARY

The object is solved according to a first aspect of the present invention by a communication system, in particular, peer-to-peer communication system, as disclosed herein. The communication system comprises at least one peer-to-peer network comprising at least one peer-to-peer application. The communication system comprises at least one peer-to-peer processing apparatus comprising at least one processor module configured to process at least a part of a first task during a first time slice and at least a part of at least one further task during at least one further time slice. The communication system comprises at least one peer-to-peer module assigned to the peer-to-peer processing apparatus and configured to communicate with the peer-to-peer application, wherein at least one of the first task and the further task is a distributed peer-to-peer application provided to the peer-to-peer processing apparatus via by means of the peer-to-peer application.

In contrast to prior art communication systems, the available (processing) resources of a communication system or network can be used in a more efficient way by providing at least a part of a distributed peer-to-peer application to a (available) peer-to-peer processing apparatus by means of a peer-to-peer application of a peer-to-peer network. In other words, the distribution, implementation and operation of task(s) in form of distributed peer-to-peer application(s) in a communication system can be managed and controlled without a central instance but by a peer-to-peer application of a peer-to-peer network.

Thereby, a peer-to-peer module assigned to the at least one processing apparatus may be capable of at least receiving a part of the distributed peer-to-peer application from the peer-to-peer application and peer-to-peer network, respectively. By the fact that instead of a central server or a platform, a peer-to-peer network (also called a framework) undertakes the in particular tamper-proof controlling of the provision and distribution of task(s) in the communication system, in particular, the provision of one or more distributed peer-to-peer application(s), by means of a peer-to-peer application, high security standards are achieved in that all computers (peer nodes or simply nodes) in the peer-to-peer network, at least a part of the peer computers (e.g. validation nodes) in the peer-to-peer network, monitor(s) at least the correct provision of said distributed peer-to-peer application to the peer-to-peer processing apparatus by means of the peer-to-peer application. The peer-to-peer processing apparatus is able to process one or more of the provided distributed peer-to-peer application(s) during two or more time slices.

Furthermore, the transaction costs can be significantly reduced. No central, superior platform, server, cloud, etc. is required. The complexity of managing and controlling a communication system can be significantly reduced. User data and other confidential data can be securely managed. Resources can be used in a more efficient way.

The peer-to-peer processing apparatus may be a computing device. The peer-to-peer processing apparatus may comprise at least one processor module, such as at least one core processor. The peer-to-peer processing apparatus is, in particular, capable of processing at least two tasks during a predefinable time unit. Preferably, the time unit is dividable in two or more time slices which can be successively (one after the other) processed by the at least one processor module.

The communication system may comprise at least one peer-to-peer module assigned to the peer-to-peer processing apparatus. Preferably, each peer-to-peer module is uniquely assigned to a respective peer-to-peer processing apparatus. For instance, each peer-to-peer processing apparatus can comprise a peer-to-peer module. Preferably, the peer-to peer module is integrated in the peer-to-peer processing apparatus.

It is also possible that a communication connection is provided between the peer-to-peer processing apparatus and the peer-to-peer module assigned to said peer-to-peer processing apparatus. This means that the peer-to-peer module can at least communicate and/or act on behalf of the peer-to-peer processing apparatus. For example, the peer-to-peer module can be partly formed by a separate processing device, such as mobile communication device (e.g. mobile phone, mobile computer, etc.), or it can run on a remote stationary processing device (e.g. in a data center). In case of a mobile communication device or a remote processing device the at least one peer-to-peer processing apparatus may have a secure communication channel to the processing device (or mobile communication device) of the data center and the processing device itself may have a connection to the peer-to-peer network. In an embodiment the remote processing device may be a gateway to the peer-to-peer network. This means that the peer-to-peer processing apparatus can securely communicate via its peer-to-peer module and the gateway to the peer-to-peer network.

In comparison to a client server communication system in which a server provides a service and a client uses the service, these roles are cancelled in the present peer-to-peer network. Each participant (e.g. node) of the peer-to-peer network can use a service and the like and offer such a service (such as the temporary processing of a task). In particular, a peer-to-peer network is self-determined and/or self-organized (without any higher-level units). In the present case preferably each node and computer, respectively, of the peer-to-peer network comprises the (same) peer-to-peer application.

The peer-to-peer module is configured to communicate, e.g. send/receive messages to/from the peer-to-peer application. The peer-to-peer module may be a peer and node, respectively, of the peer-to-peer network.

At least one task to be conducted/processed can be assigned to a peer-to-peer processing apparatus by providing at least a part of a distributed peer-to-peer application to the peer-to-peer processing apparatus such that the at least one processor module can process the part of the distributed peer-to-peer application during at least one of the plurality of time slices. The distributed peer-to-peer application (also called decentral peer-to-peer application or "DAPP") may be a software module comprising code processable by a processor module such that a specific task can be conducted. Examples of DAPPs may be A DAPP configured for Calculating (e.g. CPU usage)

A DAPP using distributed sensors to create services like brightness map

A DAPP using distributed actors (e.g. a DAPP of a first logistic provider let open a post box for parcel next to a DAPP of a further logistic provider).

By way of example, a distributed peer-to-peer application can be divided into two or more parts which can be provided to a respective number of (different) peer-to-peer processing apparatuses for processing. It may be also possible that the (total) distributed peer-to-peer application is provided to a single peer-to-peer processing apparatus.

It is noted that one or more physical standard (wired and/or wireless) communication networks can be used for communication. It shall be understood that a peer-to-peer processing apparatus and its peer-to-peer module, respectively, can be formed as a node of the peer-to-peer network, and thus, the peer-to-peer processing apparatus and its peer-to-peer module, respectively, may be a part of the peer-to-peer network including at least a part of the peer-to-peer application.

According to a first embodiment of the communication system of the present invention, the peer-to-peer application may be configured to generate at least one distributed application transaction agreement at least about the provision of the part of the distributed peer-to-peer application to the peer-to-peer processing apparatus. The distributed application transaction agreement may be stored by the peer-to-peer application e.g. in the peer-to-peer application or a storage arrangement controlled by the peer-to-peer application. In particular, technical details about the provision of at least one part of the at least one distributed peer-to-peer application can be stored in the peer-to-peer application including e.g. implementation and/or operation details. The peer-to-peer application, such as a controlling means of the peer-to-peer application, may be configured to control the provision (e.g. transmission of data packets) of the at least one part of the distributed peer-to-peer application to the at least one peer-to-peer processing apparatus in accordance with the stored technical details. Preferably, two or more entities (e.g. a request entity and at least one peer-to-peer processing apparatus) can self-sufficiently initiate the generation of a distributed application transaction agreement by the peer-to-peer application.

According to a preferred embodiment, the generated distributed application transaction agreement may comprise at least one of:

distributed application transaction criterion, part of the distributed peer-to-peer application or identifier of the part of the distributed peer-to-peer application, identifier assigned to the at least one peer-to-peer processing apparatus and/or peer-to-peer module assigned to the peer-to-peer processing apparatus, identifier assigned to a request entity and/or peer-to-peer module assigned to the request entity priority information assigned to the part of the distributed peer-to-peer application address data of a recipient of potential processing results of the processing of the part of the distributed peer-to-peer application operation details of the part of the distributed peer-to-peer application including at least one operation duration condition, such as an operation start condition and/or operation end condition.

The generated distributed application transaction agreement may comprise at least one part of the distributed peer-to-peer application to be provided and/or an identifier of the at least one part of the distributed peer-to-peer application to be provided. The (unique) identifier of the distributed peer-to-peer application can be used to access the at least one part of the distributed peer-to-peer application stored e.g. in a storage arrangement or the peer-to-peer application. E.g. the controlling means can access the storage arrangement controlled by the peer-to-peer application and can select the at least one part of the distributed peer-to-peer application to be provided based on the identifier of the at least one part of the distributed peer-to-peer application.

Further security information, such as (encryption) keys needed to access the storage arrangement, can be stored in the distributed application transaction agreement in order to increase the security.

In addition, identifiers of preferably all involved entities, such as the at least one (first) peer-to-peer processing apparatus and/or the at least one request entity can be stored. The respective identifier may be a unique (peer-to-peer) identifier assigned to the respective entity, such as the peer-to-peer processing apparatus and/or request entity, i.e. the entity which requests for the transfer of a task to one or more peer-to-peer processing apparatus.

For instance, an identifier may be a serial number, a communications address, a unique code, signature, name or other identifier of an entity, user of the entity, or the like. By storing these details, the peer-to-peer application can control the provision of a specified task to one or more specific peer-to-peer processing apparatuses.

Alternatively or preferably additionally, at least one distributed application transaction criterion may be stored in the distributed application transaction agreement. The distributed application transaction criterion may be a financial value to be transferred from an account of e.g. a request entity to an account of the provider of a peer-to-peer processing apparatus for providing processing power to the request entity in order to conduct a specific task.

The distributed application transaction agreement may comprise further details, such as priority information assigned to the part of the distributed peer-to-peer application, address data of a recipient of potential results of the processing of the part of the distributed peer-to-peer application and/or operation details of the part of the distributed peer-to-peer application including at least one operation duration condition, such as an operation start condition and operation end condition. For instance, a priority value can be defined as priority information. The priority value can be used by the peer-to-peer processing apparatus to (dynamically) allocate the time length to the time slice during which the distributed peer-to-peer application is processed. In particular, scheduling means of the peer-to-peer processing apparatus may be configured to allocate the time length of the two or more time slices to two or more tasks depending on the priority information (value) associated with a task. A task having a higher priority than another task may e.g. get a time slice with a longer time length than the other task (according to predefined allocation rules).

Further, the processing of a task may result in a processing result (e.g. one or more (intermediate or end) result data set(s)). By storing address data of the intended recipient of the processing result (e.g. the request entity) the at least one processing result can be forwarded to the desired recipient preferably by means of the peer-to-peer application.

Furthermore, a task may only be temporarily allocated or transferred to a peer-to-peer processing apparatus. In such a case, operation duration condition (s), such as an operation start condition (e.g. start time of the process or of the implementation process or other start conditions) and operation end condition (end time of the process or desired de-installation time or other end condition) (e.g. after the generation of the desired processing result) can be defined.

Such condition(s) may include the implementation time and deletion time of the distributed peer-to-peer application.

According to a further embodiment of the present invention, the peer-to-peer application may comprise at least one controlling means configured to control at least the implementation of the part of the distributed peer-to-peer application on the peer-to-peer processing apparatus. The controlling means may be, in particular, configured to control the implementation of the distributed peer-to-peer application in accordance with the generated distributed application transaction agreement. The controlling means may be also configured to control further processes e.g. according to technical details stored in the distributed application transaction agreement. For instance, the provision (e.g. transmission) of the distributed application transaction agreement (e.g. the respective data packets), forwarding of processing result(s), operation (duration) condition(s) and the like can be controlled and conducted in accordance with the generated distributed application transaction agreement by the controlling means.

The controlling means may be preferably formed by a control smart contract comprising computer code which can be capable of at least controlling the provision of the at least one part of the distributed peer-to-peer application. The controlling means can be executed by at least a part of the nodes, preferably all nodes of the peer-to-peer network. Preferably, the controlling means can be comprised by a distributed application transaction agreement. In other words, the peer-to-peer application can be configured to generate a distributed application transaction agreement including the generation of the controlling means.

Preferably, the controlling means may be configured to control the implementation of the part of the distributed peer-to-peer application on the peer-to-peer processing apparatus by causing the transmission of the part of the distributed peer-to-peer application to the peer-to-peer module assigned to the peer-to-peer processing apparatus. In other words, the roll-out of the distributed peer-to-peer application can be controlled by the controlling means of the peer-to-peer application.

Transmission of the part of the distributed peer-to-peer application includes, in particular, the transmission of one or more messages comprising portions of the at least one part of the distributed peer-to-peer application to the peer-to-peer processing apparatus and/or the provision of the part of the distributed peer-to-peer application by the peer-to-peer application such that the peer-to-peer processing apparatus can read out (e.g. download) the respective data by its peer-to-peer module. For instance, based on an identifier and/or key transmitted to the peer-to-peer module, the peer-to-peer module is capable of accessing the correct data package in order to download the correct part of the distributed peer-to-peer application (in particular, in accordance with the stored distributed application transaction agreement).

Furthermore, according to a further embodiment of the present application, the peer-to-peer processing apparatus may comprise garbage collection means configured to remove the part of the distributed peer-to-peer application. In particular, the garbage collection means can be controlled and/or monitored by the peer-to-peer application. For instance, based an end operation condition, the peer-to-peer application, e.g. the controlling means, can initiate the deletion of the previously provided part of the distributed peer-to-peer application, as defined in the generated distributed application transaction agreement. The peer-to-peer application can monitor whether the part of the distributed peer-to-peer application is actually deleted by the garbage collection means. By way of example only, the computer language GO can be used which provides (automatic) garbage collection means.

In order to further improve the manipulation security, according to a further embodiment of the communication system at least one of the first time slice and the further time slice may be formed as an encapsulated time slice. Encapsulated means that the part of the distributed peer-to-peer application is stored and processed in a secured environment. Preferably, at least all time slices comprising distributed peer-to-peer applications can be formed as encapsulated time slices. A DAPP which is running in the encapsulated environment (time slice) communicate via the operating system of the peer-to-peer processing apparatus to at least one interface (e.g. in rder to communicate with sensor(s), actor(s) and/or the peer-to-peer application). The interface may be formed by the peer-to-peer module. The operating system may be configured to allow the DAPP only to communicate during the time slice and slot, respectively, in which the DAPP is active. Outside the time slice assigned to the DAPP the Dapp cannot communicate because the operating system may give the DAPP no computing power.

In addition, the peer-to-peer processing apparatus may comprise at least one sensor and/or at least one actor. A sensor may be any measuring unit configured to measure one or more (physical) parameters. An actor may be a unit which can amend its state based on an input parameter, such as an instruction. For instance, an actor can cause a mechanical movement. The part of the distributed peer-to-peer application (temporarily) implemented on the peer-to-peer processing apparatus may be configured to operate at least one of the sensor and actor. For instance, during the first time slice allocated to a first distributed peer-to-peer application e.g. one or more actor(s) can be operated in accordance to the first distributed peer-to-peer application and during a further time slice allocated to a further distributed peer-to-peer application the one or more actor(s) can be operated in accordance with the further distributed peer-to-peer application. In a similar way, at least one sensor can be operated. A peer-to-peer processing apparatus comprising at least one sensor and/or actor can conduct two or more different tasks almost in parallel.

The transfer of a task in form of at least a part of a distributed peer-to-peer application can be initiated by a user e.g. using a request entity. According to one embodiment, the communication system may comprise at least one further peer-to-peer module assigned to at least one request entity. The peer-to-peer module assigned to the request entity may be configured to transmit a request message in order to initiate the transfer of the part of the distributed peer-to-peer application to the peer-to-peer processing apparatus. Preferably, a request message can be accepted by a peer-to-peer processing apparatus by means of an accepting message. In particular, after accepting a request message by one or more peer-to-peer processing apparatus(es), the above described distributed application transaction agreement can be generated and stored by the peer-to-peer application. Thereby, the generation of such an agreement can be initiated or caused by at least one peer-to-peer module.

Furthermore, according to one embodiment, at least one of the first task and the further task may be at least one of the group comprising:

at least a part of a further distributed peer-to-peer application, at least one peer-to-peer communication application, in particular, configured to operate the peer-to-peer module, and at least one system application.

As described above, during a first time slice at least a part of a distributed peer-to-peer application can be processed. During at least one further time slice, at least a part of a further distributed peer-to-peer application. There may be further time slice(s) reserved for predefined tasks, such as one or more system tasks in form of one or more system applications and/or one or more communication application(s) including at least one peer-to-peer communication application, in particular, configured to operate the peer-to-peer module.

What is more, according to a preferred embodiment, the peer-to-peer application may comprise at least one registration means configured to receive a registering message of a first peer-to-peer module assigned to the (first) peer-to-peer processing apparatus and/or to receive a registering message of a peer-to-peer module assigned to the request entity. The registration means may be configured to register the (first) peer-to-peer processing apparatus by storing a unique (peer-to-peer) identifier of the (first) peer-to-peer processing apparatus and/or to register the request entity by storing a unique (peer-to-peer) identifier of the request entity. For instance, in order to conduct tasks in form of one or more distributed peer-to-peer application for other participants of the peer-to-peer network a peer-to-peer processing apparatus must be registered in the peer-to-peer application.

An entity, device, apparatus, unit or the like can be registered in the peer-to-peer application as e.g. a so called smart asset. Each registered entity or apparatus can be stored with its unique (peer-to-peer) identifier e.g. in one or more identifier list(s) of authorized peer-to-peer processing apparatus and/or request entity. In particular, the respective signatures of the registered peer-to-peer processing apparatus and/or request entity can be stored in the list. Then, one or more validation node(s) can conduct a validation process by checking the signature of a received message prior to processing the message. Preferably, the signature of a received message can be compared with the stored signatures of authorized sender(s) (e.g. peer-to-peer processing apparatus(es) and/or request entity(ies)). In particular, a plurality of validation nodes can conduct said validation process. Only if all validation nodes of the peer-to-peer network come to a positive result, the message is further processed. The security can be further increased.

According to an embodiment of the communication system according to the present invention, at least one peer-to-peer module may be configured to cause a registration of the entity and apparatus, respectively, (or the corresponding peer-to-peer module) in the peer-to-peer application (or network) by transmitting a registering message comprising at least an identifier assigned to the entity (apparatus) and/or peer-to-peer module. The identifier might be already a peer-to-peer identifier or another identifier suitable to uniquely identify the entity. The (unique peer-to-peer) identifier may be a serial number or a smart asset hash of e.g. the entity, the user's name of the entity, a communication address of a peer-to-peer processing apparatus, a signature, etc. If e.g. the identifier is not already a unique peer-to-peer identifier, e.g. if the identifier is a name of a peer-to-peer processing apparatus, the peer-to-peer application, in particular, the registration means, may be configured to generate a unique peer-to-peer identifier for the respective entity (according to preset rule(s)). In particular, the registration means of the peer-to-peer application may register the respective entities by storing at least the peer-to-peer identifier and/or signature (the signature may be the identifier) in the peer-to-peer application and/or a storage arrangement controlled by the peer-to-peer application.

It shall be understood that an entity can be a user registered in the peer-to-peer application. Each registered user can be stored with or linked to its unique (peer-to-peer identifier) e.g. in one or more identifier list(s) of authorized entities. According to an embodiment of the communication system according to the present invention, a user may authenticate himself at one of the peer-to-peer processing apparatus or a user terminal of the user comprising a peer-to-peer module.

Prior to the registration of an peer-to-peer processing apparatus, request entity or the like, at least part of the nodes (peers) of the peer-to-peer network may check whether the registering requirements (such as specific entity/apparatus specifications or valid signatures or compliance requirements) predefined by the peer-to-peer network are met by the entity/device requesting registration. For instance, it may be necessary that a peer-to-peer processing apparatus meets predefined technical specifications (e.g. a predefined minimum processing power, etc.). In order to perform the check, preferably, further data may be included in the registering message. In particular, the peers/nodes of the peer-to-peer network may provide registering rules or registering requirements which must be fulfilled by an entity, peer-to-peer processing apparatus or the like to be regarded as a trustful entity. Rules/requirements may be individually defined by the peers of a peer-to-peer network. E.g. it may be necessary that a new entity must be recommended by an entity which is already a participant of the peer-to-peer network. In addition, it may be necessary that this participant must have a reputation factor which increases a predefined minimum reputation factor. A reputation factor may indicate whether a peer-to-peer processing apparatus is able to conduct transferred task trustfully and correctly.

As previously described, it may be possible that in return to the takeover of the processing of a task in form of a distributed peer-to-peer application through a peer-to-peer processing apparatus, the request entity has to fulfill at least one generated distributed application transaction criterion prior to the takeover of said task, during the processing of the task and/or after the (successful) processing of the task. For instance, one or more success conditions may be stored in the distributed application transaction agreement. According to one embodiment, the peer-to-peer application may be configured to cause the conduction of a distributed application transaction criterion transaction based on at least one distributed application transaction criterion of the stored distributed application transaction agreement, preferably, stored in the peer-to-peer application. For instance, the distributed application transaction criterion may be a financial value e.g. depending on the one or more success conditions and/or the generated priority value. For instance, the higher the priority value the higher the financial value.

Financial values can be (instantaneously) exchanged with a transaction via a cryptocurrency. In an alternative or additional embodiment micropayment channels may be used for a (constant) payment stream that can be handled e.g. partly off-chain to reduce the amount of on-chain transactions. In a further embodiment so called state channels or state networks (e.g. Raiden Network) may be used to exchange digital tokens off-chain in a secure way. Opening and/or closing of state channels may be registered on the peer-to-peer application. This means that individual transactions may not be stored on the peer-to-peer application in order to improve scalability and avoid movement tracking of pseudonyms on the peer-to-peer application. According to the present invention, a man-in-the-middle is not necessary. Fully automated processes from authentication to charging and billing can be provided.

According to a further preferred embodiment, the at least one peer-to-peer application can be a decentralized register or a shared database configured to store data, e.g. distributed application transaction agreement(s), identifier(s) (e.g. signatures), distributed peer-to-peer application(s), sensor data set(s), result data set(s) of conducted tasks, etc., with given certain proofs or signatures. In addition to e.g. identifiers, the decentral register can store computer code acting as e.g. controlling means for controlling the transfer of a distributed peer-to-peer application to one or more peer-to-peer processing apparatus(es). In particular, the code can be invoked by a transaction to the address of the code in so called 'smart contracts'. This code can be processed on the node(s) of the decentral register.

In a further embodiment the computer codes of a device may include algorithm(s) for de-central cognitive analytics or machine learning. Analytics and learning can be shared with other apparatuses and/or aggregated and further analyzed via the peer-to-peer applications.

A decentralized register can be readable at least by a part of the participants of the peer-to-peer network. In particular, every computer node, peer-to-peer processing apparatus and/or entity e.g. including at least one respective peer-to-peer module can comprise the peer-to-peer application. The decentralized register, at least the public part (i.e. may be without private contracts) may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application. A message or transaction sent to a smart contract (e.g. controlling means or registration means) may start the execution of a code of the smart contract while using data stored in the smart contract. For instance, sending a registering message to a registration means may start the execution of the code resulting in conducting the registration process, as described hereinbefore. In a similar way, an implementation process can be initiated and conducted by the controlling means formed by a smart contract.

The peer-to-peer application can be built upon the following elements: peer-to-peer network comprising Consensus System/Protocol, Data Structure, Merkle Trees, Public Key Signatures, Byzantine Fault Tolerance. It may replicate data based on a consensus principle. It may be auditable and traceable.

In a simple way information can be made available to preferably all participants. This may allow to carry out a review of the information stored in the decentral register or the code executed in the decentral register. Particularly preferably, each computer in the peer-to-peer network can be configured to review new information, in particular, based on older information stored in the peer-to-peer application. In addition, the at least one controlling means may be monitored by at least a part of the nodes of the peer-to-peer network, preferably by all nodes. A manipulation can thus be prevented, at least detected.

Moreover, preferably each computer (node) can in each case comprise the complete data content of the peer-to-peer application, but include at least a portion of the data contents of the peer-to-peer application, in particular, of the decentral register. For example, it may be provided that after a positive verification/validation (as described above) of written information (e.g. a message sent to the peer-to-peer application) in the peer-to-peer application this information is saved by all computers, at least by a part of the computers. For instance, after the generation of a distributed application transaction agreement and/or after a successful registration and/or a successful processing of a task, the agreement and/or identifier and/or processing result can be stored at least by a part, preferably all nodes of the peer-to-peer network. In other words, the data is stored by a part, preferably all nodes of the peer-to-peer network. The tamper resistance of the data stored in the peer-to-peer application can thereby be further improved. The at least temporarily transfer of a task to a peer-to-peer processing apparatus, the communication between two or more peer-to-peer processing apparatus and/or the conduction of a distributed application transaction criterion transaction can be securely controlled.

In order to store new information in a tamper-proof way, the peer-to-peer application can comprise encryption means and/or signature means and/or verification/validation means, wherein at least one of the encryption means and/or signature means and/or verification/validation means is configured to store data, such as a distributed application transaction agreement (s), identifier(s), distributed peer-to-peer application(s), processing result(s), etc. In particular, it can be provided that by the hash function a link is established with at least one previously stored information in the decentral register. Further data, such as request messages, registering messages, ordinary, contextual and/or transaction data of an entity can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present system, the peer-to-peer application can be a block chain or decentral ledger comprising at least two blocks coupled to each other (e.g. Ethereum Block chain with Smart Contracts). The block chain technology or "decentral ledger technology" is already used in the payment by means of a crypto currency, such as Bitcoin. It has been recognized that by a particular configuration of a block chain, at least the transfer of a task in form of a distributed peer-to-peer application to an peer-to-peer processing device can be checked without the need of a central server or the like. E.g. a controlling means can be easily implemented as a smart contract in a block chain. A communication system and the available processing resources in the communication system can be managed in an easy manner.

In addition, the block chain can be used to generate predefined action(s) caused by at least one peer-to-peer module and/or a controlling means in a tamper-proof manner. The block chain according to the present embodiment is particularly a decentralized, peer-to-peer-based register in which all data related to at least one access control process can be logged. A block chain is particularly suitable as a technical means to replace a central entity/server in a simple and secure manner.

In further embodiments of the peer-to-peer application, the block chain can be a permissionless or permissioned block chain. In a specific case the block chain can be public, consortium or private block chain.

In a further embodiment, the peer-to-peer application can be formed by multiple block chains which are connected via mechanisms such as side chains or smart contracts. A peer-to-peer node can run one or more different block chain client (s).

Data of the peer-to-peer application can be stored on the "decentral ledger technology" and/or the decentral ledger steers (encrypted) data storage accessible via the internet and preferably in de-central data storage arrangement, object store and database, respectively, such as Interplanetary File System (IPFS) or storj or in a distributed Blockchain database (e.g. BigChainDB). Access to encrypted data to third party entities is managed via the permission means formed as one or more smart contract(s) on the block chain.

Furthermore, data, in particular, one or more parts of a distributed peer-to-peer application can be stored on a first peer-to-peer processing apparatus wherein one or more part(s) of the distributed peer-to-peer application can be transferred to one or more further peer-to-peer processing apparatus(es) by means of the peer-to-peer application, preferably, under the control of the controlling means.

In addition, data feeds can be provided by the peer-to-peer application (so called "smart oracles"). Data feeds can provide further data relating to a task and/or peer-to-peer processing apparatus from at least one further source. For instance, further data needed to process a task can be provided by a data provider. Data can be captured from trusted sources off-chain and stored on the block chain or stored via the block chain on a decentral data storage entity.

Furthermore, information among peer-nodes can be exchanged by a peer-to-peer messaging system. This means a peer node can send a message to another peer node to submit an information or to trigger an action. Messages can be clear text, signed, hashed, time-stamped and/or encrypted. This means that not all data exchanged among peer nodes must be stored on the block chain.

In a further embodiment, the at least one peer-to-peer network can be formed by a plurality of computer nodes and e.g. a peer-to-peer module, such as the peer-to-peer module of a peer-to-peer processing apparatus, the peer-to-peer module of a request entity, etc. In other words, the peer-to-peer processing apparatus and/or the request entity may be a node of the peer-to-peer network. According to one embodiment of a peer-to-peer module said module may be only configured to communicate with the plurality of computer nodes. In other words, the peer-to-peer module is not a computer node of the peer-to-peer network but only a participant. Such a peer-to-peer module does not comprise the peer-to-peer application but only provides an interface module, such as an application programming interface (API), and a decentral application for communication with the computer nodes of the peer-to-peer network or the peer-to-peer application, such as a block chain or a smart contract on the block chain. For instance, such a peer-to-peer module can either send clear text or encrypted information or generate a secure connection (e.g. tunnel) to a peer-to-peer gateway (or so called "remote node") in order to communicate with the peer-to-peer network. This allows reducing the required processing power of the peer-to-peer module.

In one implementation of the peer-to-peer network, there can be only one validating peer or full node, e.g. only one node can be configured to perform a validation process, e.g. checking a received signature, and one or more observing (or monitoring) nodes. An observing node can validate transactions to establish a trust level but does not validate all transactions which is done by the validating peer.

In an alternative embodiment of a peer-to-peer module, the peer-to-peer module (and the assigned entity or apparatus, respectively) is one of the computer nodes. In this case, the peer-to-peer module comprises at least a part of the peer-to-peer application. In particular, the peer-to-peer module can comprise preferably the total data content of the peer-to-peer application or can access the information stored in another node. For instance, the peer-to-peer module might be a so called "light node" or a decentral application (DAPP) connected to a remote node.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit data, such as instructions information, result data sets, to the peer-to-peer application via the API. The decentral application so called "DAPP" is at least configured to process and transmit said data.

Preferably, as described hereinbefore, data and messages can be signed or encrypted or can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

Data and transactions stored on the block chain do not provide "transactional privacy". Transactions between pseudonyms may be (often) stored in clear text on the block chain. In some cases data stored on the block chain are encrypted and the keys may be handled via the block chain. Transactions between pseudonyms are stored in clear text on the block chain. Privacy preserving, secure transactions or execution of computer code can be achieved with cryptographic tools such as zero knowledge (zk) proofs or zk Succinct Non-interactive Arguments (zk-SNARK). Transactions or algorithms are separated into two parts: a smart contract on the block chain and a private contract. A privacy preserving protocol ensures the privacy of data and the correctness of code execution (SNARK verification is done via the smart contract on chain). The private contract computation can be done by at least one peer-to-peer processing apparatus and/or a set of nodes, off-chain computers and/or done in measured launch environment or a secure hardware enclave for attestation and sealing that cannot be manipulated by other software code running on the devices. In an alternative embodiment secure Multi-Party-Computing (sMPC) systems can be used for transactional privacy. Examples for privacy preserving protocols and computation are HAWK and MIT Enigma.

With zero knowledge proof (zk Proofs) the parties can see that the algorithm is executed correctly in a private contract, but the input data are not disclosed to the party. In addition selective privacy can be achieved by sharing keys to decrypt transactions for reporting and auditing purposes.

To securely deploy code and or data into a device a trusted execution environment such as Intel SGX or TPM or Direct Anonymous Attestation module can be integrated with a peer-to-peer module.

Similarly, in an alternative (not shown) embodiment a particularly large peer-to-peer network may be divided in two or more (physical or logical or dynamically virtual) clusters. In a corresponding peer-to-peer network, for example, a validation (of a subset of transactions) may only be carried out by the members of one cluster (a subset of nodes; e.g. sharding of a block chain to improve the scalability). In a further embodiment the peer-to-peer application can be formed using multiple block chains. These block chains are connected via frameworks such as sidechains or smart contracts.

A further aspect of the invention is a method for operating a communication system, in particular, a previously described communication system. The method comprises:
  providing at least a part of at least one distributed peer-to-peer application to at least one peer-to-peer processing apparatus by means of a peer-to-peer application of at least one peer-to-peer network,
  processing the provided part of the distributed peer-to-peer application by at least one processor module during at least one of a first time slice and at least one further time slice.

It is noted that the provision of at least a part of the distributed peer-to-peer application may include the distribution of the (total) distributed peer-to-peer application. The method can be used to at least temporarily transfer one or more tasks to one or more peer-to-peer processing apparatus(es).

A further aspect of the invention is a peer-to-peer processing apparatus, in particular, for a previously described communication system. The peer-to-peer processing apparatus comprises at least one processor module configured to process at least a part of a first task during a first time slice and at least a part of at least one further task during at least one further time slice. The peer-to-peer processing apparatus comprises at least one peer-to-peer module. At least one of the first task and the further task is a distributed peer-to-peer application provided to the peer-to-peer module by means of at least one peer-to-peer application of at least one peer-to-peer network.

A still further aspect of the invention is a peer-to-peer application of a peer-to-peer network. The peer-to-peer application comprises at least one controlling means configured to control the provision of at least a part of at least one distributed peer-to-peer application to at least one peer-to-peer processing apparatus such that the provided part of the distributed peer-to-peer application is processable by at least one processor module of the peer-to-peer processing apparatus during at least one of a first time slice and at least one further time slice.

The controlling means may be in particular formed as a smart contract of the peer-to-peer application, such as a block chain. For instance, the controlling means can form or be a distributed application transaction agreement.

The features of the methods, systems, modules, peer-to-peer applications, peer-to-peer processing apparatuses and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

DETAILED DESCRIPTION

Figure 1:
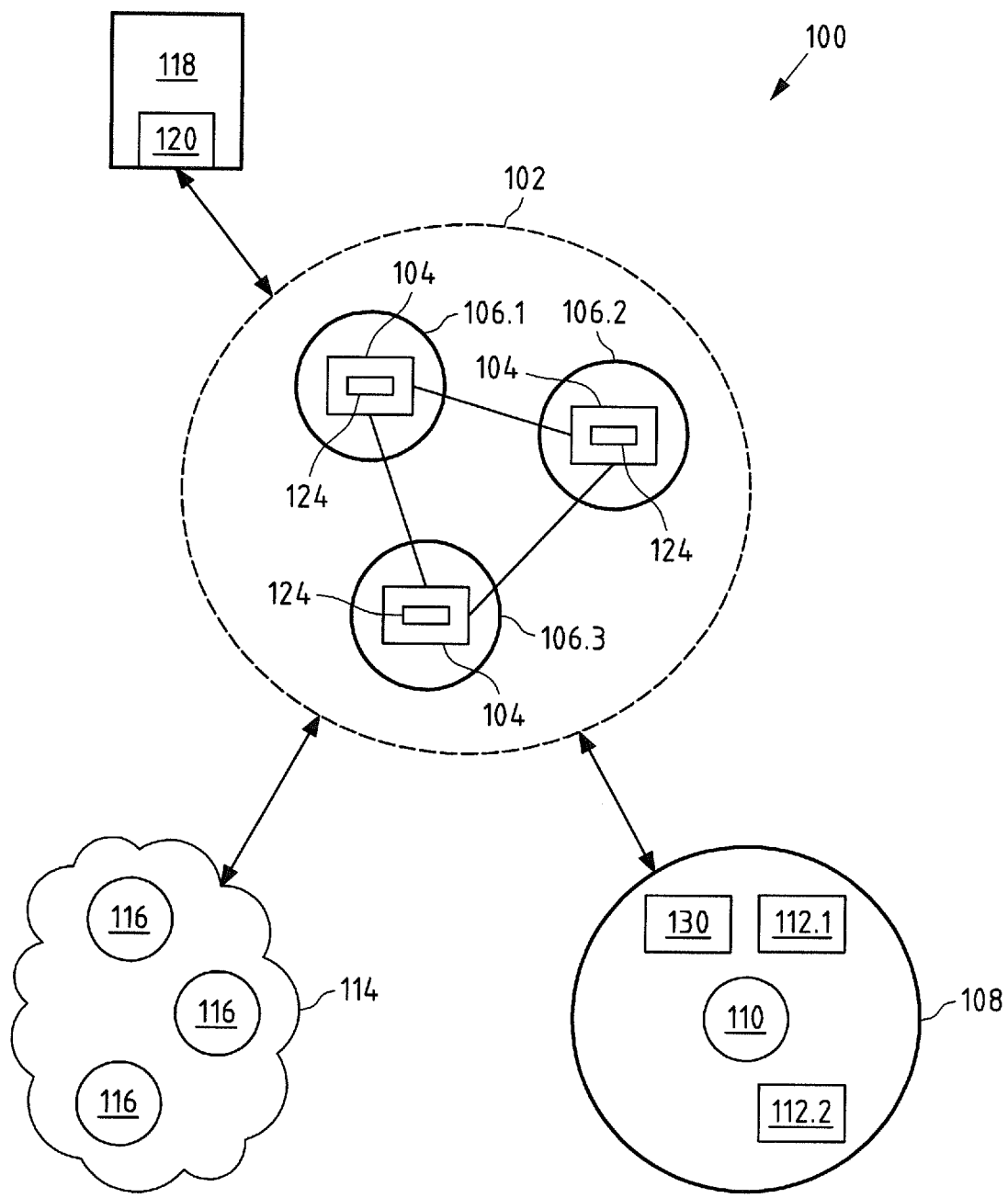
FIG. 1 shows a schematic view of a first embodiment of a communication system according to the present invention.

Like reference numerals in different figures indicate like elements.

FIG. 1 shows a first embodiment of a communication system 100, in particular, a peer-to-peer communication system 100, according to the present invention. The depicted peer-to-peer communication system 100 comprises a peer-to-peer network 102, a storage arrangement 114, a peer-to-peer processing apparatus 108 and a request entity 118 in form of a computing device 118.

In contrast to prior art systems, according to the present invention, a peer-to-peer network 102 is provided. In other words, a substantial difference compared with prior art systems is that no central instance (e.g. a backend or home controller or the like) and/or third party organization is provided. Instead of a central instance, the peer-to-peer network 102 comprises a plurality of nodes 106.1, 106.2, 106.3 and computers 106.1, 106.2, 106.3, respectively. Preferably, each of the nodes 106.1, 106.2, 106.3 comprises the (same) peer-to-peer application 104. In particular, the peer-to-peer application 104 and its content is preferably the same on each node 106.1, 106.2, 106.3 resulting in that a manipulation of one or more peer-to-peer application(s) of respective nodes can be detected due to the difference between the non-manipulated nodes.

A peer-to-peer network 102 is characterized in the present case in that each node 106.1, 106.2, 106.3 and/or participant 120, 130 is preferably connectable at least to every other node 106.1, 106.2, 106.3 and/or participant 120, 130. For instance, at least one physical standard network (wired and/or wireless) can be used for connection. For communicating via the at least one physical standard network suitable transceiver modules may be arranged in the respective entities/devices.

In addition, the computers 106.1, 106.2, 106.3 have equal rights, something which distinguishes them from a server-client structure of prior art systems.

The peer-to-peer application 104 may preferably be a public register 104 that can, in particular, be inspected by all participants 106.1, 106.2, 106.3, 120, 130 (not only the nodes 106.1, 106.2, 106.3) of the peer-to-peer network 102. As described above, each node 106.1, 106.2, 106.3 preferably has the (entire) public register 104. It may also be envisaged that only part of the register can be provided on a node (light node).

In a particularly preferred embodiment, the peer-to-peer application 104 may be a block chain 104 which will be explained in more details hereinafter. It shall be understood that the peer-to-peer network may comprise further nodes.

The peer-to-peer application 104 may be configured to manage and control the provision of distributed peer-to-peer applications (DAPPs) to one or more peer-to-peer processing apparatuses 108. The peer-to-peer application 104 may comprise a controlling means 124. In particular, the provision and implementation of a DAPP onto one or more peer-to-peer processing apparatus(es) 108 and e.g. the deletion of the DAPP from one or more peer-to-peer processing apparatus(es) 108 can be controlled by the controlling means 124 of the peer-to-peer application 104. The controlling means 124 may be formed as a smart contract 124. As can be seen, the controlling means 124 may be executed preferably on all nodes 106.1, 106.2, 106.3 of the peer-to-peer network 102 resulting in a high security.

The peer-to-peer processing apparatus 108 may be a computer 108 e.g. controlled by the peer-to-peer application 104 or a node of the peer-to-peer network. The peer-to-peer processing apparatus 108 may comprise a peer-to-peer module 130 configured to communicate with the peer-to-peer network 102 and peer-to-peer application 104, respectively. For instance, a DAPP to be transferred and, in particular, to be installed onto the peer-to-peer processing apparatus 108 may be received via the peer-to-peer module 130 from the peer-to-peer application 104. In addition, any processing results may be forwarded to the peer-to-peer application (and/or a further entity) by means of the peer-to-peer module 130.

Further, the peer-to-peer processing apparatus 108 comprises a processor module 110 configured to process a first task, such as a first DAPP 112.1, and a further task, such as a further DAPP 112.2. A more detailed explanation of the peer-to-peer processing apparatus 108 will follow (e.g. in connection with FIG. 2).

Optionally, the peer-to-peer system 100 may comprise at least one storage arrangement 114. For instance, a plurality of (different) DAPPs may be stored in a storage arrangement 114 controlled by the peer-to-peer application 104. As described above, data can be stored in the peer-to-peer application 104 and/or in a storage arrangement 114 and/or another entity (e.g. a peer-to-peer processing apparatus) controlled by the peer-to-peer application 104. Preferably, the storage arrangement 114 comprising a plurality of decentral storage units 116 may be formed as a decentral file system (such as IPFS) or a decentral object store (such as storj) or a decentral distributed database (such as BigchainDB) controlled by the peer-to-peer application 104. By way of example, the controlling means 124 can access the storage arrangement 114 to provide one or more specific DAPPs to one or more peer-to-peer processing apparatus(es) 108. For accessing the correct DAPP, each DAPP can be provided with a unique identifier. Further security means, such as encryption key(s) can be additionally used.

Further optionally, the peer-to-peer system 100 may comprise one or more (separate) request entity(ies) 118. A request entity 118 may comprise a peer-to-peer module 120 configured to communicate with the peer-to-peer network 102. For instance, the request entity 118 may send a request message to the peer-to-peer network 102 and peer-to-peer application 104, respectively, by means of the peer-to-peer module 120 in order request for the transfer of a (processing) task (e.g. in form of a DAPP) to one or more peer-to-peer processing apparatus(es) 108. It shall be understood that the request entity may be also a peer-to-peer processing apparatus (e.g. which is currently overloaded) and/or a node of the peer-to-peer network.

Figure 2:
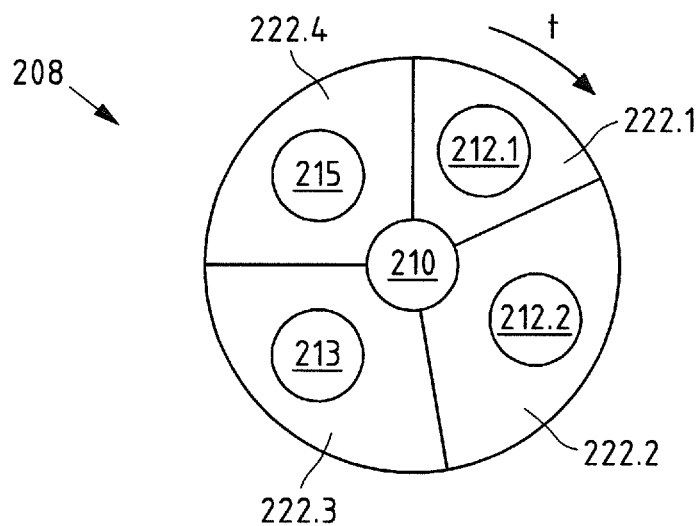
FIG. 2 shows a schematic view of an embodiment of a peer-to-peer processing apparatus according to the present invention.

FIG. 2 shows a schematic view of an embodiment of a peer-to-peer processing apparatus 208 according to the present invention. The to-peer processing apparatus 208 comprises at least one processor module 210, e.g. one or more core processors. The processor module 210 is configured to process two or more tasks during a (pre-)defined time unit. In particular, the defined time unit can be divided into two or more time slices 222.1, 222.2, 222.3, 222.4. After processing the task comprised by the last time slice 222.4 the task allocated to the first time slice 222.1 is processed again. It shall be understood that the allocation of task can be dynamically adapted e.g. based on current work load, changed priority values, etc.

For instance, during the first time slice 222.1 the processor module 210 may be configured to process a first distributed peer-to-peer application 212.1. During a second time slice 222.2 the processor module 210 may be configured to process a first distributed peer-to-peer application 212.2. Further, an internal (operational) system task 213 can be conducted during the third time slice 222.3 (e.g. scheduling means can adapt the allocation of tasks to the two or more time slices). Eventually, during a fourth time slice 222.4 a communication task 215 for communicating with the peer-to-peer application can be processed.

Preferably, the different tasks 212.1 and 212.2 can have different priorities resulting in different time slice length. For instance, a scheduling means can be provided. The scheduling means may be configured to allocate available time slices and/or time length(s) to individual time slice(s) according to predefinable rules (e.g. during the third time slice 212.3). For instance, each task may be provided with a priority value. If the first task 212.1 has a higher priority than the further task 212.2, the first time slice 222.1 can have a longer time period than the further time slice 222.2. Further, a time length of a time slices may be only configurable between a minimum time length and a maximum time length. In addition, some time slices may be fixedly reserved for mandatory tasks, such as system and/or communication tasks.

It shall be understood that there may be more or less time slices per time unit and more or less tasks, respectively.

Figure 3:
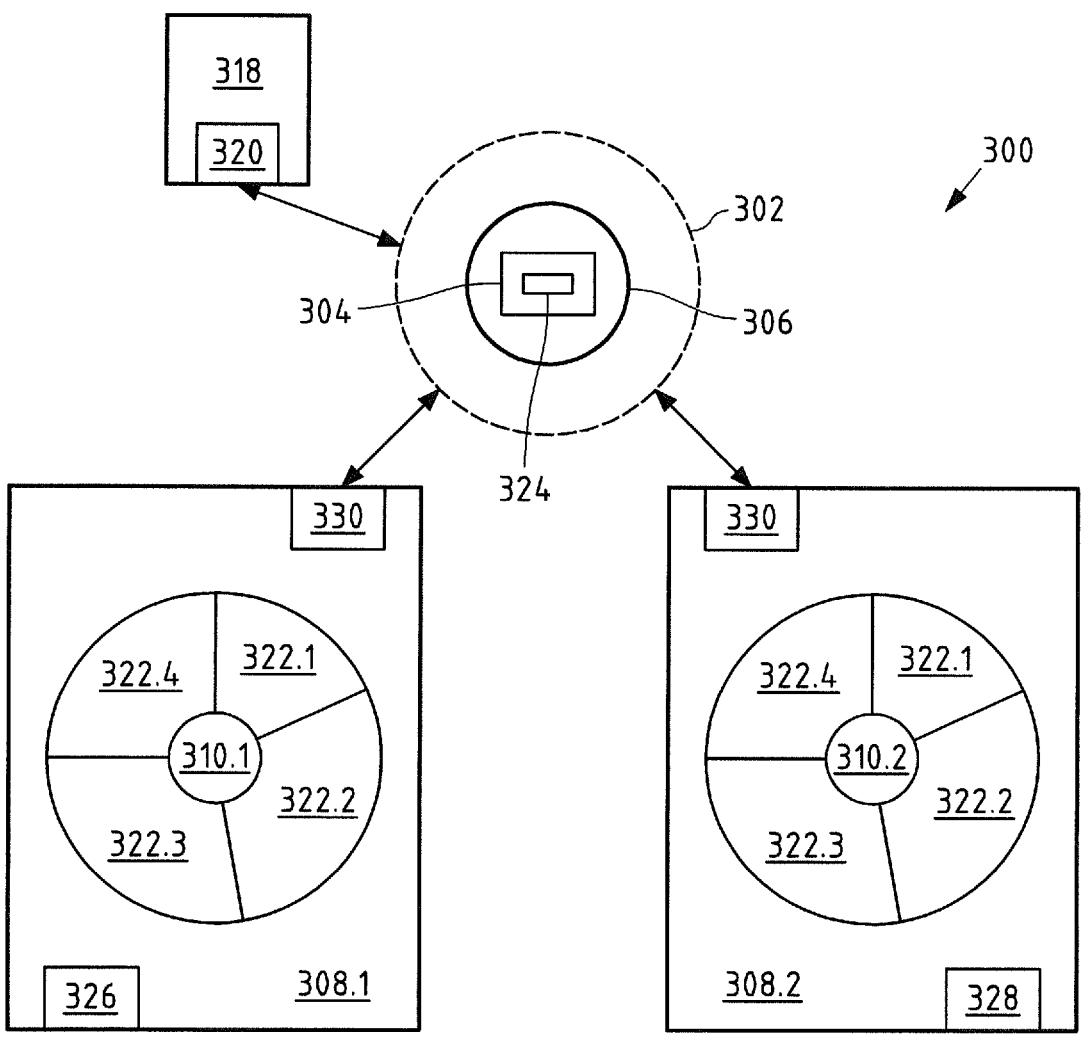
FIG. 3 shows a schematic view of a further embodiment of a communication system according to the present invention.

FIG. 3 shows a further embodiment of a communication system 300 according to the present invention. The depicted communication system 300 comprises a peer-to-peer network 301 with a plurality of nodes 306 (for the sake of clarity merely one node 306 is depicted), two peer-to-peer processing apparatuses 308.1, 308.2 and a request entity 318.

The request entity 318 may comprise a peer-to-peer module 320. By means of the peer-to-peer module 320 the requests entity 318 may send a request message for the transfer of a task to one or more peer-to-peer processing apparatuses 308.1, 308.2 to the peer-to-peer application.

Furthermore, a first peer-to-peer processing apparatus 308.1 may comprise at least one processor module 310.1 and at least one sensor 326. The further peer-to-peer processing apparatus 308.2 may comprise at least one processor module 310.3 and at least one actor 328. As previously described, during a defined time unit (e.g. the time unit may preferable be between a few millisecond up to some seconds (may depend e.g. on switching time of actors and/or sensors)) two or more tasks can be conducted during two or more respective time slices 322.1 to 322.4.

For instance, based on a request (and on a subsequent generated distributed application transaction agreement) of the request entity, a first task in form of a first distributed peer-to-peer application can be implemented on the first peer-to-peer processing apparatus 308.1 and e.g. processed during a first time slice 322.1. For instance, the sensor 326 can be operated during the first time slice 322.1 in accordance with the distributed peer-to-peer application. During a further time slice (e.g. 322.4) a communication task can be processed by transmitting sensor data set(s) to the peer-to-peer application, wherein the sensor data set(s) comprise one or more sensor value(s) measured during the first time slice 322.1. In particular, the sensor data set(s) can be forwarded to the peer-to-peer application 324 by means of the peer-to-peer module 330. Preferably, the peer-to-peer module 330 can provide the at least one sensor data set (and the message, respectively) with a unique signature. The peer-to-peer application may be configured to conduct a validation process by checking the signature of a received message prior to processing the message. In particular, all nodes (at least a part of the nodes, i.e. the validation nodes) may conduct this process e.g. by comparing the signature of the received sensor data set (or any other message) with stored valid signatures. Only if a match is found by at least all validation nodes the validation result is positive and the sensor data set (or any other message) may be further processed, e.g. forwarded to a request entity or another peer-to-peer processing apparatus.

During a second time slice 322.2 the sensor 326 can be operated in accordance with a further distributed peer-to-peer application. In a similar way, the further peer-to-peer processing apparatus 308.2 and its actor can be operated.

Figure 4:
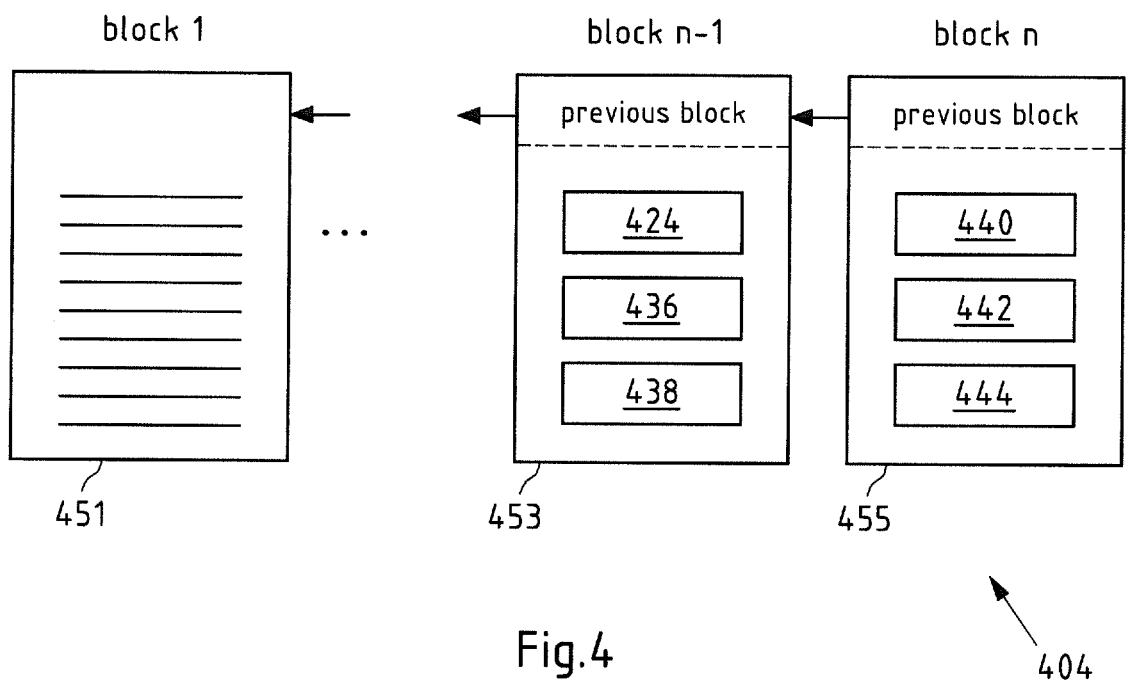
FIG. 4 shows a schematic view of an embodiment of a peer-to-peer application according to the present invention.

FIG. 4 shows an embodiment of a peer-to-peer application 404 according to the present invention.

The depicted peer-to-peer application 404 is a register readable, in particular, by the participants of the peer-to-peer network. Thereby, data set(s) or information e.g. in form of messages can be written and/or read into/from the register 404 by a peer-to-peer module of an peer-to-peer processing apparatus, a request entity and/or any other participants in the peer-to-peer network. In a preferred embodiment, the peer-to-peer application 404 may be a block chain 404.

Hereinafter, it is assumed in the following description of the present embodiment that the at least one peer-to-peer application 404 is a block chain 404. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In further embodiments of the peer-to-peer application the block chain can be a permissionless or permissioned block chain. In a specific case the block chain can be public, consortium or private block chain.

In a further embodiment, the peer-to-peer application can be formed with multiple block chains which are connected via mechanisms such as side chains or smart contracts. Interoperability among block chains can be established.

The block chain 404 is formed by at least one block 451, 453, 455, preferably by a plurality of interconnected blocks 451, 453, 455. The first block 451 may also be called genesis block 451. As can be seen, a block 453, 455 (except for the first block 451) refers to each previous block 451, 453. A new block can be created by a computationally intensive process (for example, so called "mining" or through another appropriate process, such as voting) and will be particularly provided to all participants of the peer-to-peer network.

The present block chain 404 is particularly adapted to receive messages, such as messages comprising sensor data set(s), request data, result data set(s), distributed peer-to-peer application(s), registering data, etc., e.g. from a peer-to-peer module of a previously described peer-to-peer processing apparatus, request entity, off-chain computing entity or from another peer-to-peer device/unit of another participant of the peer-to-peer network. Further, the block chain 404 is particularly adapted to save these messages in the block chain 404. Furthermore, the block chain 404 is configured to generate messages e.g. based on a request message, instruction message, event, validation process, a processing result and/or caused by a peer-to-peer module and/or the execution of code of e.g. a controlling means 424. In particular, the block chain 404 is at least configured to control and manage a communication system, such as shown in FIG. 1 and/or 3.

In particular, a (newly) received message can be saved and published in the current block 455 of the block chain 404. Due to the configuration of a block chain 404 as a public register 404, said data message of e.g. a peer-to-peer module can be read by preferably all participants of the peer-to-peer network. Alternatively or additionally, data of a message may be stored on a decentral file service or distributed block chain database controlled by the block chain 404.

As already described, in the present block chain 404 different types of messages and data sets, respectively, for example, within a smart contract (algorithm and/or storage at the block chain 404) can be processed and/or stored. In the present example, the block chain 404 comprises a controlling means 424 in form of a smart contract 424. As previously described the controlling means 424 may be at least configured to control the provision of a distributed peer-to-peer application to a peer-to-peer processing apparatus.

Furthermore, in the block chain 404 one or more distributed application transaction agreement(s) 436 may be stored. A distributed application transaction agreement 436 may be generated on an initiation of at least one entity, such as a user and/or peer-to-peer processing apparatus and/or request entity which desires the transfer of at least one task to at least peer-to-peer processing apparatus in order cause the processing of the task by the peer-to-peer processing apparatus. An example of a generation of such a distributed application transaction agreement 436 will be described in the following:

A distributed application transaction agreement 436 may comprise at least one of the following data:

Identifier(s): One or more identifier(s) of the involved entities, such as an identifier of the request entity, and one or more identifier(s) of the one or more peer-to-peer processing apparatus(es) to which a one or more tasks should be provided, identifier of the provider entity of the one or more peer-to-peer processing apparatus(es), etc.

Distributed Application Transaction Criterion: Criterion that must be fulfilled by e.g. a request entity for the provision, implementation and/or operation of a task in form of a distributed peer-to-peer application to/by the at least one peer-to-peer processing apparatus Task: At least a part of the distributed peer-to-peer application to be provided (e.g. an identifier and/or storage address of the part of the distributed peer-to-peer application)

Priority Information E.g. a priority value indicating the urgency of the conduction of a task Further Operation Details E.g. details about the desired processing results and the transmission of the results to the request entity (or another entity), start condition (e.g. start time) and/or end condition (e.g. end time), success condition(s) of a tasks, etc.

The distributed application transaction criterion may be e.g. an amount of cryptocurrency e.g. per time unit (e.g. per h) which has to be transferred prior to, during and/or after the provision and/or conduction of the task to and/or through at least one peer-to-peer processing apparatus. Preferably, at least a part of the agreed amount of cryptocurrency can be locked by the peer-to-peer application 404 prior to the provision action. In an embodiment the distributed application transaction criterion may be a payment channel for streaming small amounts of crypto tokens per each time unit. It shall be understood that other transaction criteria and further information can be included in a distributed application transaction agreement 436. More information/criteria can be, for example, a time stamp, an ID of the transaction agreement and the like. In addition, the In order to generate a distributed application transaction agreement 436, a peer-to-peer module of a request entity (e.g. a peer-to-peer processing apparatus or other computing device) and the peer-to-peer application or a further peer-to-peer module of a provider entity (e.g. a peer-to-peer processing apparatus or other computing device of e.g. the provider/user of a peer-to-peer processing apparatus) can exchange request and response (acceptance) messages via the peer-to-peer application 404. A request message 438 may comprise indications about the above data (e.g. identifiers, transaction criteria, desired task(s), desired time frame).

For instance, a request entity may send a request for a transfer of a task in form of a distributed peer-to-peer application to the peer-to-peer application in order to detect one or more peer-to-peer processing apparatus(es) capable of performing the task as desired (e.g. within desired processing time period (e.g. desired start and end time), desired priority, desired distributed application transaction criterion, etc.). In response to such a request message a peer-to-peer module of a peer-to-peer processing apparatus(es) may transmit an acceptance message 440 to the peer-to-peer module of the request entity. As a result a distributed application transaction agreement can be generated. For instance, the acceptance message 440 may comprise identical or at least similar data details as compared with a request message 438. Additionally, the acceptance message 440 can comprise a reference indication to a previous message, such as the ID of the request message 438.

If, for example, the acceptance message 440 comprises a higher or other transaction criterion and/or another desired processing time period, the acceptance message 440 can be called a counter-offer message. This can be accepted by the peer-to-peer module of the request entity through a further acceptance message. Based on this a peer-to-peer module of a request entity and/or provider entity and/or peer-to-peer processing apparatus may cause the generation of a distributed application transaction agreement 436 about the transfer of at least one task to the at least one peer-to-peer processing apparatus and the subsequent processing of the task by the peer-to-peer processing apparatus.

In particular, there can be multiple offer messages and/or request/accepting messages and/or messages comprising a requested peer-to-peer processing apparatus/distributed peer-to-peer application for different transaction criterions. Each entity can give guidelines, according to which at least one distributed application transaction agreement 436 or other agreements can be generated. In a preferably automated, such as iterative process, each request/offer message can be associated to an optimally corresponding acceptance message. The block chain 404 may be configured to generate, based on the messages of a peer-to-peer module, a distributed application transaction agreement 436.

In addition, each peer-to-peer processing apparatus can transmit offer messages to the peer-to-peer application comprising information about the capabilities of a peer-to-peer processing apparatus, such as processing power, available processing time for a future time period, available sensor(s) and/or actor(s), reputation factor, distributed transaction criterion and the like. Based on the current status, each peer-to-peer processing apparatus can send updated offer messages e.g. regularly, at predefined time points and/or depending on detected status changes.

Further, the controlling means 424 may be configured to control the provision of the at least one part of a distributed peer-to-peer application to be processed by a processor module of a peer-to-peer processing apparatus during a time slice of a plurality of time slices, in particular, based on the one or more distributed application transaction agreement(s) 436. The controlling means 424 may be executed by at least part of the nodes of the peer-to-peer network for conducting the provision of said part of a distributed peer-to-peer application. Thereby, the controlling means 424 can be a part of the distributed application transaction agreement(s) 436. For instance, based on a stored part of a distributed peer-to-peer application or stored identifier of a stored part of a distributed peer-to-peer application, the peer-to-peer application 404, in particular, the controlling means 424 may provide the part of a distributed peer-to-peer application to the at least one peer-to-peer processing apparatus (defined in the distributed application transaction agreement(s) 436).

Also an update transaction agreement can be generated and stored in the peer-to-peer application comprising information about the conduction of update process(es) of at least one peer-to-peer processing apparatus.

Moreover, a block chain 404 may comprise a registration means 442 configured to register a (new) peer-to-peer processing apparatus and/or request entity in the block chain 404 as a smart asset. Also a new evaluating means and/or storage arrangement or the like can be registered.

After a positive registration process, the respective entity can be registered within the block chain 404 e.g. by storing its unique identifier in an identifier list 444. Further details can be stored in the list, such as signatures, technical specifications of the entity, permissions, etc.

The list comprising e.g. signatures of authorized participants of the peer-to-peer network (and of the communication system) can be used for a previously described validation process.

Figure 5:
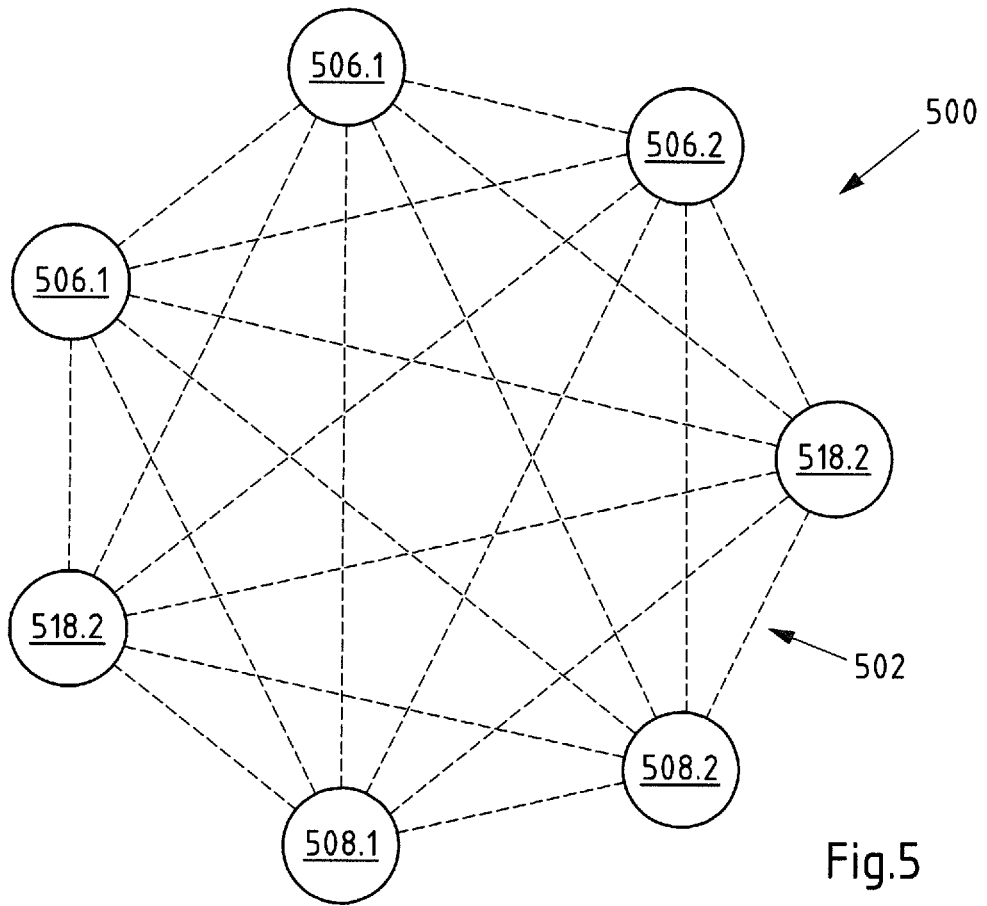
FIG. 5 shows a schematic view of a further embodiment of an communication system according to the present invention.

FIG. 5 shows a schematic view of another embodiment of a communication system 500 of the invention. In the present embodiment only nodes and participants 506.1, 506.2, 508.1, 508.2, 518.2 of the peer-to-peer network 502 are shown. In the present example, it is assumed that all nodes 506.1, 506.2, 508.1, 508.2, 518.2 comprise the peer-to-peer application (not shown).

The nodes 508.1, 508.2 may correspond to peer-to-peer processing apparatuses and e.g. be formed by the respective peer-to-peer modules of the peer-to-peer processing apparatuses. The node 518.2 may be a request entity realized by a peer-to-peer module of the request entity. Nodes 506.1 and 506.2 may be other nodes which are not a peer-to-peer processing apparatus and/or request entity. It shall be understood that nodes can be full, remote or light nodes.

As can be seen, two different types of peers or node computers 506.1, 508.1, and 506.2, 508.2. 518.2 are presently illustrated. All peers 506.1, 506.2, 508.1, 508.2, 518.2 are comprised by the peer-to-peer network 502. In the present embodiment, however, only a part of the peers 506.1, 506.2, 508.1, 508.2, 518.2 in the present case, the peers (nodes) 506.1, 508.1, check the validity (e.g. conduct a validation process) of e.g. a signature of a received message, a provision process (e.g. comprising the controlling means and execute the controlling means in accordance with a generated agreement) of a task in form of a distributed peer-to-peer application and/or further data stored in the peer-to-peer application, such as agreements, sensor data set messages, processing result messages, and the like.

Furthermore, only a part of the entire peers can be configured to store the peer-to-peer application and/or only a part of the peers can be configured to execute the algorithms of a smart/private contract (e.g. only peers 506.1, 508.1, as previously described). Since the validation/verification of e.g. identification data requires a considerable computational effort, it may be advantageous for reasons of efficiency, if only a part of the peers 506.1, 508.1, especially particularly powerful 506.1, 508.1 perform the validation and/or controlling algorithms.

Validation, analytics and optimization can be done on-chain or off-chain, as described hereinbefore. Off-chain validation and/or optimization can be managed by the peer-to-peer application, like the code on the block chain. Powerful means in particular a high computing power. In other words, in the present case a valid entry in the peer-to-peer application, such as a block chain, is assumed if (only) a part of the peers 506.1, 508.1 comes to a positive result. It shall be understood that only a single, especially particularly powerful peer can perform the validation, analytics and/or optimization process.

Similarly, in an alternative (not shown) embodiment, a particularly large peer-to-peer network may be divided in two or more clusters. In a corresponding peer-to-peer network, for example, a validation will only be carried out by the members of one cluster (e.g. sharding of a block chain to improve the scalability). In a further embodiment the peer-to-peer application can be formed using multiple block chains. These block chains are connected via frameworks such as sidechains or smart contracts or interlegder.

Figure 6:
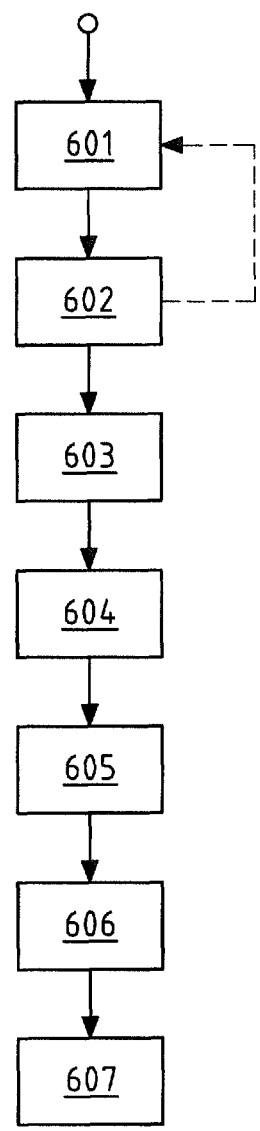
FIG. 6 shows a diagram of an embodiment of a method according to the present invention.

FIG. 6 shows an embodiment of a method according to the present invention. The method is, in particular, configured to operate a communication system, such as the communication system according to FIG. 1 and/or 3.

In a first step 601, a request entity may send a request message to the peer-to-peer application. For instance, a first peer-to-peer processing apparatus may form the request entity. For example, the first peer-to-peer processing apparatus is currently overloaded, and thus, desires to transfer a task (or part of a task) to a further peer-to-peer processing apparatus currently having free resources. Before transmitting a request message to the peer-to-peer application, the first peer-to-peer processing apparatus may read out current offer message(s) of one or more further peer-to-peer processing apparatus(es) stored in the peer-to-peer application.

For instance, one or more further peer-to-peer processing apparatus(es) can transmit (e.g. by its peer-to-peer module) an offer message comprising one or more of the following information:

Processing power
Available sensor(s)
Available actor(s)
Geographic location (e.g. GPS coordinates)
Availability (e.g. future time period) of processing power, sensor, actor, etc.
Distributed application transaction criterion, Pot. agreement term (e.g. start and/or end condition (e.g. time))

Necessary entitlement(s)

Identifier of the peer-to-peer processing apparatus

Reputation factor

The request message of the first peer-to-peer processing apparatus can refer to a specific offer message (e.g. using an identifier of the offer message and/or identifier of the peer-to-peer processing apparatus). The request message can comprise similar information as the offer message. Further information may be information about the desired task to be transferred and/or priority information.

The peer-to-peer application and/or a further peer-to-peer processing apparatus may respond to a request message by transmitting an acceptance message to the first peer-to-peer processing apparatus. If there are deviations between the content of the request message and the content of the acceptance message, the acceptance message can be called a counter-offer message. It may be possible that a plurality of messages between two or more entities are exchanged e.g. in an automatic and iterative process (indicated by the dotted arrow).

Further, it is noted that each message can be provided with a signature of the sender. Validation nodes may conduct a validation process by checking the signature of a received message, as previously described. The present method may only be prosecuted if (all) validation nodes come to a positive result. Otherwise the method may be interrupted and/or stopped.

After a request message is accepted, in step 603, the peer-to-peer application can generate a distributed application transaction agreement. In said agreement technical and further details about the at least temporarily transfer of a task from e.g. the first peer-to-peer processing apparatus to the further peer-to-peer processing apparatus can be stored, as described above.

In step 604, the controlling means may control the provision (e.g. transmission) and e.g. implementation of a part of a distributed peer-to-peer application in accordance with the generated distributed application transaction agreement. For instance, based on a start condition and an identifier of the desired distributed peer-to-peer application, the controlling means may initiate the transmission and implementation of the distributed peer-to-peer application to/on the further peer-to-peer processing apparatus.

Then, in step 605, the at least one processor module of the further peer-to-peer processing apparatus processes the provided and implemented distributed peer-to-peer application during at least one time slice of a plurality of time slices. The processing may be controlled and/or monitored by the peer-to-peer application and e.g. by validation node(s) of the peer-to-peer network. E.g. a sensor and/or actor may be operated and/or processing result(s) may be transmitted to e.g. the first peer-to-peer processing apparatus, in particular, in accordance with the generated distributed application agreement.

After a successful processing of said distributed peer-to-peer application by the at least one processor module of the further peer-to-peer processing apparatus, e.g. by detection of the fulfillment of an end condition and/or success condition stored in the distributed transaction agreement, the distributed peer-to-peer application may be irretrievably deleted by e.g. a garbage collection means (step 606). Also this process step can be conducted under the control of the peer-to-peer application and the validation nodes, respectively.

In the present case, in step 607 a distributed application transaction criterion transaction can be conducted. For instance, a stored financial value can be (instantaneously) exchanged with a transaction via a cryptocurrency from an account assigned to the request entity to an account assigned to the further peer-to-peer processing apparatus. As described above, step 607 can alternatively or additionally be performed prior to transferring the task and/or during the conduction of the task.

There may be further optional steps. For instance, the request entity can (automatically) assess the performance of the further peer-to-peer processing apparatus. Based on the assessment, a reputation factor can be adapted.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A communication system, in particular, peer-to-peer communication system, comprising:
at least one peer-to-peer network with a plurality of nodes comprising at least one peer-to-peer application,
at least one peer-to-peer processing apparatus connectable to the nodes and comprising at least one processor module configured to process at least a part of a first task during a first time slice and at least a part of at least one further task during at least one further time slice, at least one peer-to-peer module assigned to the peer-to-peer processing apparatus and configured to communicate with the peer-to-peer application,
wherein at least one of the first task and the further task is a distributed peer-to-peer application provided to the peer-to-peer processing apparatus by means of the peer-to-peer application,
wherein the peer-to-peer application comprises at least one controlling means configured to control the implementation of a part of the distributed peer-to-peer application on the peer-to-peer processing apparatus by causing the transmission of the part of the distributed peer-to-peer application to the peer-to-peer module assigned to the peer-to-peer processing apparatus, and
wherein the transmission of the part of the distributed peer-to-peer application includes the transmission of one or more messages comprising at least portions of the part of the distributed peer-to-peer application to the peer-to-peer processing apparatus and/or the provision of the part of the distributed peer-to-peer application by the peer-to-peer application such that the peer-to-peer processing apparatus can download the respective data by its peer-to-peer module;
wherein at least one of the first time slice and the further time slice is formed as an encapsulated time slice,
wherein a distributed peer-to-peer application which is running in the encapsulated time slice communicates via an operating system of the peer-to-peer processing apparatus to at least one interface, and
wherein the operating system is configured to allow the distributed peer-to-peer application only to communicate during the time slice in which the distributed peer-to-peer application is active.

2. The communication system according to claim 1, wherein the distributed peer-to-peer application is divided into two or more parts, wherein the parts are transmitted to a respective number of different peer-to-peer processing apparatuses.

3. The communication system according to claim 1, wherein
the communication system comprises at least one storage arrangement controlled by the peer-to-peer application and configured to store a plurality of distributed peer-to-peer applications,
wherein the controlling means is configured to access the storage arrangement to provide one or more specific peer-to-peer applications to one or more peer-to-peer processing apparatuses.

4. The communication system according to claim 1, wherein the peer-to-peer application is configured to generate a distributed application transaction agreement about the provision of the part of the distributed peer-to-peer application to the peer-to-peer processing apparatus wherein the distributed application transaction agreement comprises at least one of:
distributed application transaction criterion,
part of the distributed peer-to-peer application or identifier of the part of the distributed peer-to-peer application,
identifier assigned to the at least one peer-to-peer processing apparatus and/or peer-to-peer module assigned to the peer-to-peer processing apparatus,
identifier assigned to a request entity and/or peer-to-peer module assigned to the request entity,
priority information assigned to the part of the distributed peer-to-peer application,
address data of a recipient of potential processing results of the processing of the part of the distributed peer-to-peer application,
operation details of the part of the distributed peer-to-peer application including at least one operation duration condition, such as an operation start condition and/or operation end condition.

5. The communication system according to claim 1, wherein at least one scheduling means is provided, wherein the scheduling means is configured to allocate available time slices and/or time length(s) to individual time slice(s) according to predefinable rules, wherein the scheduling means is, in particular, configured to allocate the time length of the at least two time slices, to two or more tasks depending on the priority information associated with a task.

6. The communication system according to claim 1, wherein the peer-to-peer processing apparatus comprises at least one garbage collection means configured to remove the part of the distributed peer-to-peer application.

7. The communication system according to claim 1, wherein
the peer-to-peer processing apparatus comprises at least one sensor and/or at least one actor,
wherein the part of the distributed peer-to-peer application is configured to operate at least one of the sensor and actor.

8. The communication system according to claim 1, wherein
the communication system comprises at least one further peer-to-peer module assigned to at least one request entity,
wherein peer-to-peer module assigned to the request entity is configured to transmit a request message in order to initiate the transfer of the part of the distributed peer-to-peer application to the peer-to-peer processing apparatus.

9. The communication system according to claim 1, wherein at least one of the first task and the further task is at least one of the group comprising:
at least a part of a further distributed peer-to-peer application,
at least one peer-to-peer communication application, in particular, configured to operate the peer-to-peer module assigned to the peer-to-peer processing apparatus,
at least one system application.

10. The communication system according to claim 1, wherein
the peer-to-peer application comprises at least one registration means configured to receive a registering message of a peer-to-peer module assigned to the peer-to-peer processing apparatus and/or to receive a registering message of a peer-to-peer module assigned to a request entity,
wherein the registration means is configured to register the peer-to-peer processing apparatus by storing a unique identifier of the peer-to-peer processing apparatus and/or to register the request entity by storing a unique identifier of the request entity.

11. The communication system according to claim 4, wherein the peer-to-peer application is configured to cause the generation of a distributed application criterion transaction based on at least one distributed application criterion of the stored distributed application transaction agreement.

12. The communication system according to claim 1, wherein
the at least one peer-to-peer application is a decentralized register or a shared database, wherein the peer-to-peer application is configured to store data with given certain signatures.

13. The communication system according to claim 1, wherein the at least one peer-to-peer application is a block chain or decentral ledger comprising at least two blocks coupled to each other.

14. A method for operating a communication system, the method comprising:
providing at least a part of at least one distributed peer-to-peer application to at least one peer-to-peer processing apparatus by means of at least one peer-to-peer application of at least one peer-to-peer network,
wherein the peer-to-peer network comprises a plurality of nodes connectable to the peer-to-peer processing apparatus,
wherein the at least one peer-to-peer processing apparatus comprises at least one processor module configured to process at least a part of a first task during a first time slice and at least a part of at least one further task during at least one further time slice, wherein at least one of the first task and the at least one further task comprises the distributed peer-to-peer application;
wherein at least one peer-to-peer module is assigned to the at least one peer-to-peer processing apparatus and is configured to communicate with the peer-to-peer application;
controlling, by a controlling means, the implementation of a part of the distributed peer-to-peer application on the peer-to-peer processing apparatus by causing the transmission of the part of the distributed peer-to-peer application to the peer-to-peer module assigned to the peer-to-peer processing apparatus,
wherein the transmission of the part of the distributed peer-to-peer application includes the transmission of one or more messages comprising at least portions of the part of the distributed peer-to-peer application to the peer-to-peer processing apparatus and/or the provision of the part of the distributed peer-to-peer application by the peer-to-peer application such that the peer-to-peer processing apparatus can download the respective data by its peer-to-peer module, and
processing the provided part of the distributed peer-to-peer application by at least one processor module of the peer-to-peer processing apparatus during at least one of the first time slice and the at least one further time slice;
wherein the at least one processor module is configured to process two or more tasks during a predefined time unit, wherein the predefined time unit is divided into two or more time slices, wherein after processing the task comprised by the last time slice of the predefined time unit the task allocated to the first time slice is processed again.

15. The communication system of claim 1, wherein outside of the encapsulated time slice assigned to the distributed peer-to-peer application the distributed peer-to-peer application cannot communicate because the operating system do not give computing power to the distributed peer-to-peer application.

16. The communication system of claim 1, wherein the part of the distributed peer-to-peer application running in the encapsulated time slice is stored and processed in a secured environment.

17. A communication system, in particular, peer-to-peer communication system, comprising:
at least one peer-to-peer network with a plurality of nodes comprising at least one peer-to-peer application,
at least one peer-to-peer processing apparatus connectable to the nodes and comprising at least one processor module configured to process at least a part of a first task during a first time slice and at least a part of at least one further task during at least one further time slice,
at least one peer-to-peer module assigned to the peer-to-peer processing apparatus and configured to communicate with the peer-to-peer application,
wherein at least one of the first task and the further task is a distributed peer-to-peer application provided to the peer-to-peer processing apparatus by means of the peer-to-peer application,
wherein the peer-to-peer application comprises at least one controlling means configured to control the implementation of a part of the distributed peer-to-peer application on the peer-to-peer processing apparatus by causing the transmission of the part of the distributed peer-to-peer application to the peer-to-peer module assigned to the peer-to-peer processing apparatus,
wherein the transmission of the part of the distributed peer-to-peer application includes the transmission of one or more messages comprising at least portions of the part of the distributed peer-to-peer application to the peer-to-peer processing apparatus and/or the provision of the part of the distributed peer-to-peer application by the peer-to-peer application such that the peer-to-peer processing apparatus can download the respective data by its peer-to-peer module, and
wherein the at least one processor module is configured to process two or more tasks during a predefined time unit, wherein the predefined time unit is divided into two or more time slices, wherein after processing the task comprised by the last time slice of the predefined time unit the task allocated to the first time slice is processed again.

* * * * *